(12) United States Patent
Stute

(10) Patent No.: US 7,374,833 B2
(45) Date of Patent: May 20, 2008

(54) DEVICE FOR A FUEL CELL SUPPLY

(75) Inventor: Manfred Stute, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 553 days.

(21) Appl. No.: 10/769,977

(22) Filed: Feb. 3, 2004

(65) Prior Publication Data
US 2004/0247966 A1    Dec. 9, 2004

(30) Foreign Application Priority Data
Feb. 4, 2003   (DE) ............................... 103 04 540
Feb. 14, 2003  (DE) ............................... 103 06 234

(51) Int. Cl.
*H01M 8/04*    (2006.01)
*H01M 2/00*    (2006.01)
(52) U.S. Cl. .......................................... 429/26; 429/34
(58) Field of Classification Search ................. 429/26, 429/34
See application file for complete search history.

(56) References Cited

U.S. PATENT DOCUMENTS 5,722,241 A * 3/1998 Huber ........................ 60/728

2003/0035988 A1 * 2/2003 Graage ........................ 429/26
2003/0170518 A1 * 9/2003 Clawson et al. .............. 429/26
2003/0182944 A1 * 10/2003 Hoffman et al. .............. 60/772
2004/0151958 A1 * 8/2004 Formanski et al. ........... 429/26

FOREIGN PATENT DOCUMENTS

DE    19755116 C1    3/1999
DE    10139608 A1    2/2003
EP     0629013 B2    1/2000

* cited by examiner

*Primary Examiner*—Mark Ruthkosky
*Assistant Examiner*—Karie O'Neill
(74) *Attorney, Agent, or Firm*—Crowell & Moring LLP

(57) ABSTRACT

A device used for air supply of a fuel cell has an expander and a compressor that is at least partially driven thereby. The hot gases of combustion at least occasionally flow through the expander. After flowing through the expander, the exhaust gases emit at least a portion of the residual thermal energy remaining in them to at least one of the fuel flows supplied for combustion and during a cold start especially also to the cooling circuit of the fuel cell. A device of this type may be used, for example, in a mobile fuel cell system.

2 Claims, 2 Drawing Sheets

DEVICE FOR A FUEL CELL SUPPLY

This application claims priority of German patent application 103 04 540.6, filed Feb. 4, 2003, and German patent application 103 06 234.3, filed Feb. 14, 2003, the disclosures of which are incorporated herein by reference.

BACKGROUND AND SUMMARY OF THE INVENTION

The present invention relates to a device for the air supply of a fuel cell having an expander and a compressor that is at least partially driven thereby in which hot exhaust gases of combustion at least partially flow through the expander.

A device of this type for the air supply of a fuel cell system is known from German Patent DE 197 55 116 C1. In this case, the fuel cell is supplied via a compressor, which is coupled to an expander and an electric motor. The expander in this context at least occasionally supplies a portion of the drive energy for the compressor depending on the operating state. The expander itself is driven by the exhaust gases of the fuel cell, which are after-burned as fuel is added in a catalytic burner.

The disadvantage of a structure of this type lies in the energy requirements for the combustion as well as the structural requirements for the expander. Starting at an exhaust gas temperature level of approximately 80° C. for the fuel cell, which is configured as a PEM fuel cell, a suitably high temperature level must be reached before entering the expander in order for it to be operated effectively. Therefore, in practically all operating states, heating with fuel in the area of the catalytic burner is necessary. Moreover, the achievable temperature is consequently limited by the catalytic burner itself because its catalysts do not enable any temperatures as high as one might desire. Yet, in order to reach as high an energy yield as possible under these preconditions and produce a temperature level after the expander that can be directly emitted into the environment as is without having to accept large energy losses, an accordingly more complex and high-quality expander is necessary. However, this makes the device for air supply disadvantageously very expensive, very difficult, and correspondingly susceptible to any kind of disturbance.

On this basis, an object of the present invention is to provide a device for air supply of a fuel cell of the aforementioned type that avoids the aforementioned disadvantages and which enables a structure that is simple as well as energy-optimized and highly variable with regard to output.

According to the invention, this object is achieved by having the hot gases, after flowing through the expander, emit at least part of the thermal residual energy remaining in them to at least one of the fuel flows supplied for combustion.

The emission of residual thermal energy from the exhaust gases after the expander to at least one of the gases flowing for combustion, which can be, for example, the anode and cathode exhaust gases coming out of the fuel cell, enables a distinct pre-heating of these educts for combustion. Thus, a clearly higher temperature level can be achieved with clearly less fuel consumption than is the case for the prior art.

The fact that the residual energy from the exhaust gases after the expander is expediently used also allows an operation of the expander at temperatures that are better to use in terms of energy than if a temperature approaching the ambient temperature would have to be present after the expander. Thus, the expander can be produced in an accordingly simpler, easier and smaller type of construction than in the prior art and yet have a higher variability with regard to the output that it produces.

According to a very advantageous further development of the invention, the device is configured in such a manner that the exhaust gases after the expander flow through a heat exchanger through which air for the combustion also flows.

This construction is very favorable in that it is especially expedient in terms of energy to preheat the air for combustion because, due to the generally high proportion of inert substances such as nitrogen, it generally has a clearly greater flow volume than fuel and has a clearly higher thermal capacity. This thermal capacity becomes especially high with the previously addressed anode and cathode exhaust gases from the fuel cell because they also still contain water. The fuel, which is supplied at a clearly lower flow volume, will not reach thermal capacities of this kind, so the preheating of the air makes more sense in terms of energy.

In an especially favorable embodiment of the device of the present invention, it can also be provided that, at least during occasional phases of the operation of the device, the exhaust gases, after they have emitted at least a portion of the residual energy contained therein after the expander to the at least one of the fuel flows supplied for combustion, emit additional thermal residual energy remaining in them to a cooling medium for the fuel cells.

In this way, the residual energy that is still contained in the exhaust gases after the preheating of the educts or the air for the combustion can also be used. This especially makes sense in the case of a cold start because in this case, by heating the cooling medium, the fuel cell itself is heated through which this cooling medium also flows. Moreover, in the case of a cold start, higher outputs of the expander may make sense, for example, for the air supply of burners for the preheating of components of a gas generation system or similar system. Thus, there will frequently be a higher temperature level of the exhaust gases anyway, so even the remaining residual energy in the exhaust gases after the preheating of the educts is higher. This can then be very effectively used for preheating the fuel cell and in some cases other components located in the cooling circuit via their cooling medium.

An especially advantageous use of the device of the present invention or one of its possible embodiments provides for installing the device for air supply in a mobile fuel cell system.

For mobile systems of this type, which can be a drive unit for a land, water or air vehicle, such as an auxiliary power unit (APU)—as a function of or independently of a vehicle of this type—a high variability of the output and a lightweight, cost-effective and robust design, as is achieved by the present invention, is especially favorable.

DETAILED DESCRIPTION OF THE INVENTION

Figure 1:
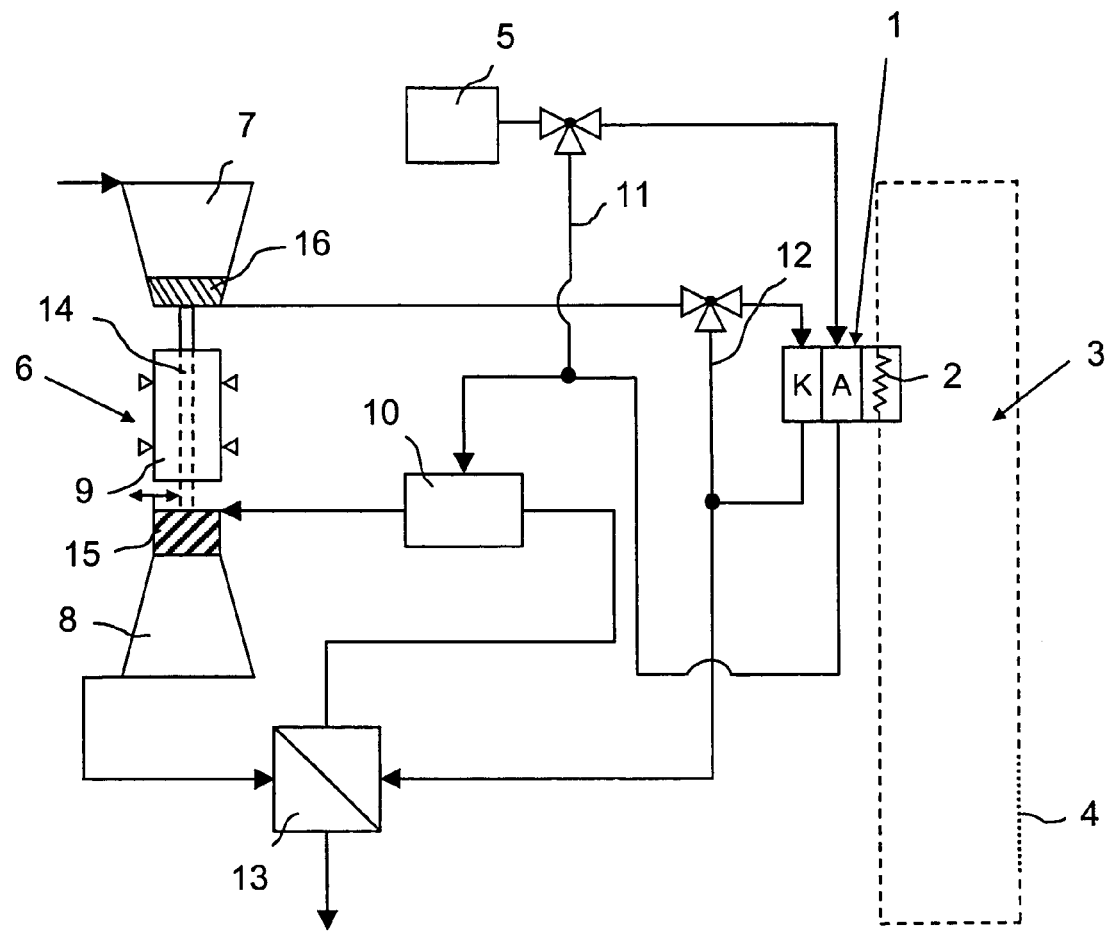
FIG. 1 is a schematic diagram of a device according to the present invention together with a fuel cell.

In FIG. 1, a fuel cell 1 is depicted having a cathode chamber K and an anode chamber A. Fuel cell 1 is to be configured in a known way as a fuel cell stack on the basis of individual PEM fuel cells. In addition to cathode chamber K and anode chamber A, which are separated from each other by the proton-exchange membrane (PEM), fuel cell 1 also has cooling devices 2 through which a cooling medium flows and which are a part of a known and standard cooling circuit 3. This cooling circuit 3 has additional components, such as a radiator for the emission of heat into the environment, a delivery device for the cooling medium and/or the like. These additional components are not explicitly depicted in cooling circuit 3, which is illustrated here, but are just indicated in their basic structure by the stippled area 4. Nevertheless, they are generally known anyway and do not play any role for the designs described below.

The fuel cell 1 is provided on the side of its anode chamber A with hydrogen or a hydrogen-containing, possibly hydrogen-enriched gas. In the figures presented here, this gas originates from a hydrogen-producing device 5 that is indicated in its essential features. In this hydrogen-producing device 5, the hydrogen can be stored or generated in various known ways. The storage of the hydrogen is to be cited here, for example, as compressed hydrogen, liquid hydrogen or by means of metal hydrides. As examples for the generation, various gas generation systems can be mentioned in which the hydrogen is produced by oxidation and/or reformation from additive substances such as hydrocarbons and/or hydrocarbon derivatives and water. The hydrogen-containing gas that results can, after suitable cleaning devices, for example, selective oxidation phases, membranes that are selectively permeable for hydrogen or the like, then be supplied as more or less pure hydrogen or as hydrogen-containing gas to anode chamber A of fuel cell 1.

Cathode chamber K of fuel cell 1 is provided with air as an oxidation agent via an air supply device 6. The air supply device 6 comprises a compressor 7, an expander that is connected thereto and an electric machine 9. The compressor 7 compresses the air starting from atmospheric pressure up to the pressure needed to supply cathode chamber K. The drive energy needed for the compressor 7 is supplied in this context at least partially by expander 8 in which the exhaust gases from fuel cell 1 are released. In order to increase the efficiency of the expander, the residual amounts of oxygen and hydrogen still contained in the exhaust gases, and in some cases residual amounts of the additive substances, are burned in the configuration of the hydrogen-producing device 5 as a suitable gas-generating system so that the hot exhaust gases of the combustion, which have a clearly higher energy content than if the combustion had been eliminated, flow into the expander.

This combustion thus occurs in a burner 10. Burner 10 can be configured as a catalytic burner or as a burner with flame combustion, e.g. pore burners, open flames or the like. A configuration as a catalytic burner thus offers the advantage of a controlled full combustion without residues.

In order to affect this combustion and thus also the energy to be produced by the expander 8, fuel, in the exemplary embodiment illustrated here the hydrogen or the hydrogen-containing gas from the hydrogen-producing device 5, can be supplied to burner 10 via a line 11. This line 11 could also supply all of the fuel needed for the combustion. This is conceivable in the case of a cold start of fuel cell 1 if fuel has not yet been routed through anode chamber A. Likewise, it is conceivable, if the fuel cell 1 is operated with nearly pure hydrogen in a so-called dead-end operation or with a residual hydrogen recirculation from the output of anode chamber A to its intake. In these variants in which typically no anode exhaust gas reaches burner 10, a suitable enrichment with fuel via line 11 would make sense.

Also the air arriving at burner 10 can arrive at burner 10 via a line 12 bypassing cathode chamber K. In addition to the case of a cold start in which this bypass around the cathode chamber via line 12 is typical according to the general prior art, additional air could also be routed to the burner 10 during operation, whereupon its variability is increased accordingly.

Regardless of whether the air for the combustion in burner 10 originates from cathode chamber K, from the bypass of line 12 around fuel cell 1 or from a combination thereof, before it flows into burner 10, it will always first flow through the heat exchanger 13. In the heat exchanger 13, the air is preheated from the temperature level that is typically present in the fuel cell 1 or after the compressor 7 to an inlet temperature of over 150° C. to 200° C. before the burner 10. Serving as the energy source for this is the exhaust gas coming out of expander 8, which, in the case of an inlet temperature into expander 8 of, for example, 400° C., still exhibits 200 to 250° C. The energy brought into the air by preheating in turn conserves combustion energy, which is needed to get to the aforementioned 400° C. before entry into expander 8, thus after exiting from burner 10. The use of the residual energy after the expander 8 in the process makes it possible for the expander 8 to be operated at a comparatively high output temperature and thus very flexibly with respect to the energy output for the compressor 7.

Expander 8 is configured together with compressor 7 as a modular unit, at least one of the two components 7, 8 having means for affecting the medium that is flowing in or out. In addition to this, the electric machine 9 may also be integrated into the module of air supply device 6. Components 7, 8, 9 of air supply device 6 are then disposed in an ideal manner on a common shaft 14 that, for the purpose of clean incoming air to the fuel cell 1, is as oil-free as possible. Thus, as an air supply device 6 a compact module is produced that can be driven by the electric machine 9 when additional power is needed.

The air supply device 6 is then configured in a favorable manner as a high-speed compressor/expander unit having an integrated electric machine 9. A radial compressor with an adjustment screen is used as a compressor 7; a turbine with a variable turbine guide screen 15 is used as an expander 8, as is indicated essentially in FIG. 1. The adjustment screen and variable turbine guide screen 15, as one of the aforementioned means for affecting the medium that flows in or out typically at speeds in the order of 50,000 to 150,000 revolutions per minute, offer the possibility of a very wide load range.

Another alternative or additional possibility for one of the aforementioned means for affecting the medium flowing in or out is indicated as an example in the area of a compressor 7. This is a variable diffuser 16, which also enables a further increased variability in terms of load range.

The construction depicted in FIG. 2 corresponds to that of FIG. 1 over wide ranges so that only the differences will be explained below.

A first difference is constituted by an additional heat exchanger 17, through which the exhaust gases leaving heat exchanger 13 are routed. This heat exchanger 17, which, primarily in the case of a cold start, can be switched via valve device 18 completely or partially into the exhaust gas flow after heat exchanger 13, provides for a heating of the cooling medium in cooling circuit 3. Thus, a more rapid heating of the cooling medium, and thus of the fuel cell 1, can be achieved. The cold start time, that is the time until the fuel cell 1 is at operating temperature and can start its work according to specification, is thereby significantly shortened.

In addition to this direct disposition of the heat exchanger 17 in the exhaust gases after the heat exchanger 13 and expander 8, an indirect disposition is also conceivable in which another heat exchanger medium and/or heat-exchanging or heat-transporting component (e.g. its own cold start heat exchanger circuit or similar arrangement) is used to transmit the residual heat into the cooling circuit 3 or into the fuel cell 1.

Another difference is recognizable in the supply of fuel for combustion in the burner 10. This originates from the area of anode chamber A and/or from another fuel source 19. This additional fuel source 19 can in turn be its own fuel tank or similar arrangement. This source can also be in the area of the gas generation system if one is used. There, specifically in addition to hydrogen, the additive substance itself, or a residue accumulating during cleaning of the hydrogen-enriched gas, e.g. the residual gas usually containing still high portions of hydrocarbon compounds from which by means of a membrane that is selectively permeable for hydrogen the hydrogen has been removed, could be used as a fuel cell 19.

Figure 2:
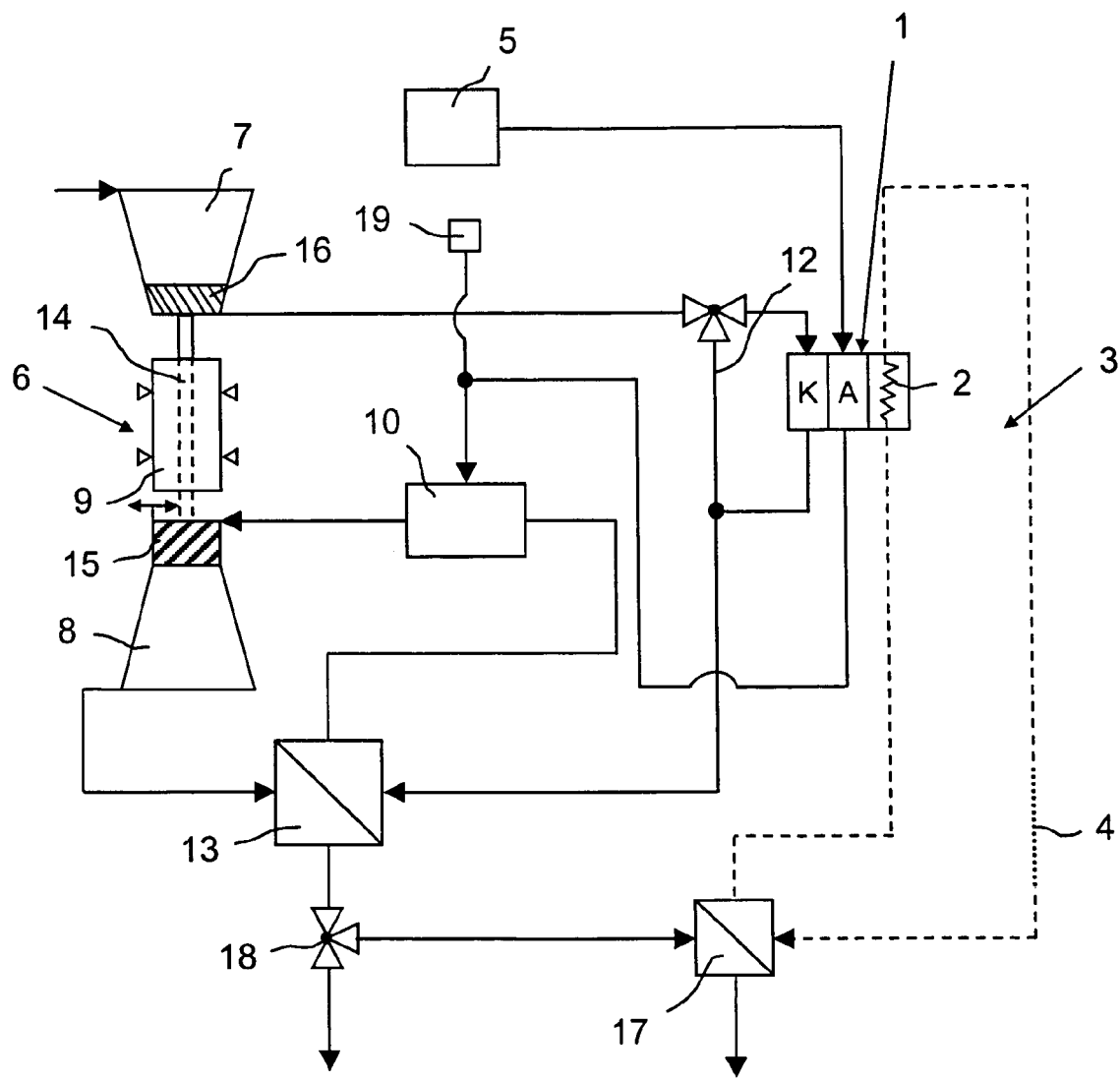
FIG. 2 is an alternative embodiment of the device according to the present invention together with the fuel cell.

The embodiments that were described within the context of both FIGS. 1 and 2 can be produced in the described forms as well as in all conceivable combinations thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for air supply of a fuel cell comprising:
an expander,
a compressor that is at least partially driven thereby,
a burner producing hot gases of combustion that at least occasionally flow through the expander, and
a heat exchanger disposed between the expander and the burner that transfers at least a portion of thermal residual energy remaining in the hot gases, after flowing through the expander, to at least one of air and cathode output supplied for combustion,
wherein the heat exchanger receives exhaust gases from the expander as well as air that flows through the heat exchanger for combustion.

2. A mobile fuel cell system having a device for air supply of a fuel cell comprising:
an expander,
a compressor that is at least partially driven thereby,
a burner producing hot gases of combustion that at least occasionally flow through the expander, and
a heat exchanger disposed between the expander and the burner that transfers at least a portion of thermal residual energy remaining in the hot gases, after flowing through the expander, to at least one of air and cathode output supplied for combustion,
wherein the heat exchanger receives exhaust gases from the expander as well as air that flows through the heat exchanger for combustion.

* * * * *